Patented June 27, 1950

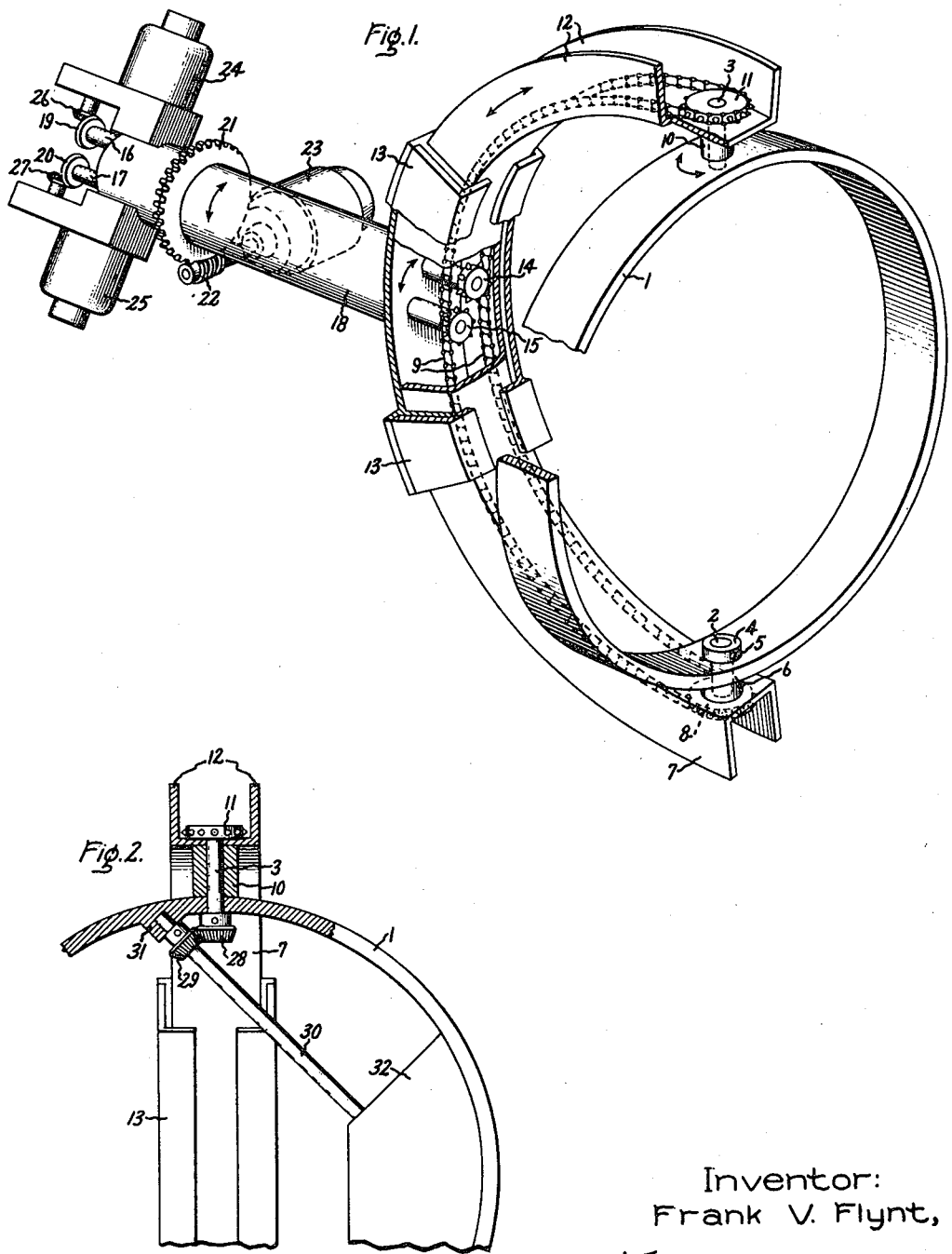

2,512,636

UNITED STATES PATENT OFFICE 2,512,636

SEMICIRCULAR TYPE SUPPORT AND DRIVE FOR RECEIVER PARABOLA STABILIZATION

Frank V. Flynt, Los Angeles, Calif., assignor to General Electric Company, a corporation of New York Application August 28, 1946, Serial No. 693,592

7 Claims. (Cl. 74—469)

1

This invention relates to universal supports. More particularly the invention is directed to a support comprising a pivoted yoke structure for supporting a gimbal wherein driving elements are arranged to permit controlled positioning of the axis of the gimbal. The device incorporating the invention is particularly adapted to the support of a scanning receiver for shipboard use, such as a sonic or supersonic echo receiver for underwater object locating, but is not limited to such application.

An object of my invention is to provide an improved universal support for an object wherein rotation of the object may be controlled about three axes.

A further object is to provide a support with a supported-object-rotating mechanism which will permit rotation of the object about a predetermined stabilized axis at a constant speed, the mechanism being adapted for compensation required by reorientation of the foundation for the support. For example, if the support is to be mounted to the hull of a ship, the mechanism may be arranged to provide compensation for rolling and pitching of the hull, as well as for yawing if desired.

It is contemplated that the device will be particularly useful aboard ship for the scanning of a predetermined sector by a directional receiver fastened within the gimbal. The sector can be scanned at a constant angular rate and in a predetermined plane by providing suitable mechanism for rotation about two axes, to compensate for rolling and pitching, as for instance when the scanning sector is to be related in azimuth to the center line of the ship. The device may be readily mounted to extend from the hull below the water line, though permitting control from within the hull, because of the simplicity with which water seals may be applied to prevent leakage around the support into the hull.

Further objects and advantage of the invention will be apparent from the following description when taken in conjunction with the drawings in which: Fig. 1 is a perspective view of a support partially cut away to show a portion of the operating mechanism; and Fig. 2 is a partially cut away side view of a modified portion of the support showing a power take-off mechanism for providing mechanical power to the object mounted in the support.

As shown in Fig. 1, the support according to my invention comprises a mounting gimbal 1 for the desired object which may be, for example, a receiving head for receiving sonic or supersonic

2 waves from a predetermined direction with respect to the orientation of the head. The gimbal may be circular as shown, or may be otherwise shaped if desired. Mounting shafts 2 and 3 are provided at top and bottom of the gimbal to permit rotation thereof, shaft 2 being attached at one end to the gimbal through a collar 4 and pin 5. Shaft 2 is free to rotate in a spacer 6 separating the gimbal from yoke member 7 and carries a sprocket 8 at its other end for cooperation with a driving chain 9, through which driving energy may be applied to cause rotation of the gimbal about the axis of the shafts 2 and 3, yoke 7 being provided with a bearing surface to permit rotation of shaft 2. Shaft 3 is mounted in bearing surfaces in yoke 7 and in gimbal 1, and carries a spacer 10. Shaft 3 is provided with a sprocket 11 for engagement with chain 9 and normally comprises an idler shaft. The yoke 7 is preferably formed of a channel member to furnish convenient retaining side walls 12 for the driving chain 9. Yoke 7 is mounted within arcuate shoe 13 so as to be free to slide against the inner bearing faces of the shoe, which may be smooth surfaces or surfaces provided with suitable anti-friction devices such as balls or rollers. The sliding motion of the yoke in the shoe will be seen to be about an axis through the center of the circle defined by semi-circular yoke 7. This axis will be perpendicular to the plane of the yoke and midway between sprockets 8 and 11. Sprockets 14 and 15 splined to the ends of shafts 16 and 17 respectively are arranged for cooperation with the chain 9. Shafts 16 and 17 extend through the primary mounting shaft 18 and are free to turn therein. Gears 19 and 20 are splined to the other ends of shafts 16 and 17. Shoe 13 is rigidly attached to the end of shaft 18. Shaft 18 carries an external gear 21 which is in driven relationship with worm gear 22 arranged for rotation by a suitable mechanical energy source, such as a Selsyn motor 23. A bearing, not shown, is provided around shaft 18 between gear 21 and shoe 13 to permit rotation of the shaft by motor 23. Rotation of the shaft causes rotation of shoe 13, yoke 7 and gimbal 1 about the axis of shaft 18. Carried at the end of the shaft remote from the yoke are two Selsyn type motors 24 and 25. Motors 24 and 25 are arranged as sources of mechanical energy to drive gears 19 and 20 through suitable couplings, including gears 26 and 27, to provide rotation of shafts 16 and 17, sprockets 14 and 15 and, through driving chain 9, rotation of sprockets 8 and 11.

In typical operation the device comprising my invention may be mounted with shaft 18 extending through the hull of a ship so as to be parallel to the longitudinal axis of the ship. The bearing in which shaft 18 is mounted for rotation may include a seal to prevent water from entering the hull when the device is mounted below the water line. Motor 23 and gears 21 and 22, as well as motors 24 and 25 and their associated driving mechanisms will be within the hull, whereas the shoe 13, yoke 7 and gimbal 1 will be outside. Suitable sealing devices should be applied also to shafts 16 and 17 and may conveniently comprise a portion of the bearings within shaft 18. It will be understood that the sealing devices form no part of this invention but may be desirable when the supporting device is used as a support for an underwater object locating receiver.

The receiving head mounted in gimbal 1 is arranged to scan a predetermined angle or sector irrespective of rolling and pitching of the ship. To accomplish this result the rolling is compensated for by rotation of shaft 18 through operation of motor 23 so as to maintain the plane of yoke 7 in a vertical position. Compensating motion of the yoke 7 for pitching of the ship will be later described. The receiver head mounted within gimbal 1 is made to scan through the predetermined angle or sector in a plane which may be horizontal or tilted downward from the bow of the ship. It will be understood that this plane will be perpendicular to the axis of shafts 2 and 3 so that rotation of the gimbal provides the scanning action. The rotation is accomplished by rotating shafts 16 and 17 in the same direction and at the same speed. Accordingly, sprocket wheel 14 drives one portion of continuous chain 9 in one direction, such as a downward direction as shown in the figure, which would be caused by clockwise rotation of sprocket wheel 14, while sprocket wheel 15, also rotating in a clockwise direction, drives the opposed portion of the chain in an upward direction. Motion of the chain is transferred through sprocket wheel 8 to shaft 2 and gimbal 1. As seen in Fig. 1, the rotation of gimbal 1 would be in a clockwise direction about the axes of shafts 2 and 3. In the meantime, shaft 3 is driven in a counterclockwise direction through sprocket wheel 11. Shaft 3 is free to turn in bearings in yoke 7 and in gimbal 1, and accordingly, the rotation of shaft 3 unlike shaft 2 causes no corresponding rotation of gimbal 1. Assuming the axis of shafts 2 and 3 to be vertical, pitching of the vessel will cause a reorientation of the gimbal which can be compensated for by sliding yoke 7 through shoe 13. This sliding motion is accomplished by causing a speed differential in motors 24 and 25, thus causing sprocket wheel 14, for instance, to turn more rapidly than sprocket wheel 15. If these two sprocket wheels are both rotating in a clockwise direction but one faster than the other, it will be readily understood that chain 9 will be effectively shortened between sprocket wheels 14 and 15 for the loop about sprocket wheel 11 and will be lengthened for the loop around sprocket wheel 8, causing wheel to be pulled toward wheels 14 and 15 and permitting wheel 8 to move further away. The rapidity at which the resultant yoke rotation occurs is dependent upon the amount of speed differential applied to the motors, and the extent of yoke rotation depends on the total differential in number of rotations of wheels 14 and 15. If the speed differential of motors 24 and 25 is applied to increase the speed of rotation of one of the shafts 16 and 17 by the same amount that the speed of rotation of the other shaft is decreased, it will be found that the speed of rotation of sprocket wheel 8, shaft 2 and gimbal 1 will remain constant. It will not normally be necessary to make corrections for the yawing of the ship since the location of underwater objects will usually be determined with respect to the center line of the ship. It will be obvious, however, that increasing or decreasing the speed of rotation of motors 24 and 25 together will result in a direct and equal change in the speed of rotation of shaft 2 and gimbal 1 so that, if desired, this type of compensation for yawing may also be applied.

In most applications it will be found desirable to apply suitable signals derived from roll and pitch gyroscopes to motor 23 and motors 24 and 25, respectively, resulting in entirely automatic compensation of the gimbal axis for rolling and pitching of the ship or other object on which my device is employed.

While a particular type of operation has been described, it will be apparent that the axis of gimbal 1 is controllable so that it is maintained in a predetermined orientation with respect to the supporting structure, such as a ship. Shaft 18 need not necessarily parallel the longitudinal axis, since, for instance, if shaft 18 coincides with a transverse axis of the ship, rolling may be compensated for by sliding yoke 7 within shoe 13, and pitching by rotation of shaft 18. Mounting shaft 18 parallel to one of the major axes of the ship is highly desirable as regards simplicity of stabilizing controls.

In certain applications, it may be desirable to furnish mechanical energy to the object mounted within gimbal 1. The modification of a portion of the support according to the invention shown in Fig. 2 provides a simple means of obtaining this energy through a power take-off from the idler sprocket through shaft 3. Shown in Fig. 2 in a partially cut away end view are shoe 13, yoke 7, sprocket wheel 11, shaft 3 and spacer 10 positioned and arranged as in Fig. 1. As noted above, shaft 3 rotates as an idler shaft in bearings provided in yoke 7 and in gimbal 1, respectively, and this rotation is in the opposite direction to the rotation of shaft 2 and gimbal 1. Gear 28 is provided on the end of shaft 3 which extends through gimbal 1 and is arranged in cooperation with gear 29 on shaft 30, for which a supporting bearing 31 is provided on the body of the gimbal. Shaft 30 extends into object 32, shown mounted within gimbal 1. Since shaft 3 is rotated at the speed of rotation of the gimbal but in the opposite direction and since gear 29 and bearing 31 rotate with the gimbal around gear 28, it will be found that the speed of shaft 30, with respect to object 32, will be twice the speed of rotation of shaft 3 or of gimbal 1 when gears 28 and 29 have equal numbers of teeth. The speed of rotation of shaft 30 will be constant so long as the speed of rotation of the gimbal 1 remains constant, irrespective of any adjustment provided by the pitching compensation action description above, since sprocket wheel 11 rotates at a constant speed, just as does sprocket wheel 8, when a differential speed is applied by motors 24 and 25.

Modifications of the support to adapt it to many different applications will be apparent to those skilled in the art, and it is intended accordingly to be limited only by the scope of the appended claims.

What I claim as new and desire to secure by Letters Patent of the United States is:

1. A support for an object comprising a gimbal adapted to hold said object, a semi-circular yoke pivotally supporting said gimbal at two diametrically opposed points, said points defining an axis of rotation for said gimbal, said yoke being slidingly mounted in an arcuate shoe, a rotatable support for said shoe arranged to rotate said shoe, yoke and gimbal about a predetermined axis, a continuous flexible driving member forming a complete loop along, and between the ends of said yoke and extending over and between rotatable wheels adjacent to said points in driving relationship therewith, one of said wheels being in driving relationship with said gimbal to provide rotation thereof about said axis of rotation, coacting dual driving means operative at said shoe to rotate the loop of said flexible member to drive said wheels and arranged when operated at different speeds to change the respective lengths of said loop between said shoe and each of said wheels to thereby pull said yoke through said shoe to provide rotation of said yoke and said axis of rotation about an axis perpendicular to the plane of said yoke.

2. In combination, an arcuate yoke member, a gimbal member rotatably supported at two diametrically opposed points by said yoke member for rotation about the axis defined by said points, a shaft member adapted for rotatable mounting in a bearing member, said shaft member slidingly supporting said yoke member to permit rotation of said points in the plane of said yoke member, a continuous flexible driving member disposed in a loop along said yoke, driving means for said driving member, driven means engaged by said driving member comprising two wheels, said wheels being respectively disposed adjacent to said points, means comprising said wheels and said driving member for causing rotation of said points in the plane of said yoke member said last means comprising means for rotating said gimbal about said axis.

3. In combination, an arcuate yoke member, a rotatable gimbal supported in said yoke member by two diametrically opposite pivots defining an axis of rotation for said gimbal in the plane of said yoke member, one of said pivots comprising a driving connection for said gimbal, a shoe slidingly supporting said yoke member to permit rotation thereof about a second axis perpendicular to said axis of rotation, means to reorient said axis of rotation for said gimbal at will comprising means to rotate said shoe about a third axis perpendicular to said second axis, and means associated with said shoe rotating means comprising at least two sources of mechanical energy for rotating said gimbal through said driving connection and for rotating said yoke member about said second axis.

4. In combination, a mounting member for an object pivotally supported at two diametrically opposed points in an arcuate yoke member, means for slidingly supporting said yoke member to permit rotation thereof about a first axis, means for rotating said yoke member supporting means to rotate said yoke about a second axis, and means for rotating said object mounting member in said yoke member operative at one of said points and comprising in part means for rotating said yoke member about said first axis.

5. A gimbal support comprising an arcuate yoke member, diametrically opposed pivots in said yoke member defining an axis of rotation for a gimbal, a rotatable support slidingly supporting said yoke member, a driven member extending along said yoke member in driving relationship therewith, means for driving said driven member to rotate said yoke member by a sliding motion in said support to thereby adjust the orientation of said axis of rotation in a first plane, and means to rotate said rotatable support to adjust the orientation of said axis in a second plane.

6. In combination, an arcuate yoke member, a rotatable gimbal supported in said yoke member by two diametrically opposite pivots defining an axis of rotation for said gimbal in the plane of said yoke member, one of said pivots comprising a driving connection for said gimbal, the other of said pivots comprising a driven idler connection, a shoe slidingly supporting said yoke member to permit rotation thereof about a second axis perpendicular to said axis of rotation, rotatable mounting means for said shoe to permit rotation thereof about a third axis perpendicular to said second axis, means associated with said shoe mounting means comprising at least two sources of mechanical energy for rotating said gimbal through said driving connection and for reorienting said axis of rotation at will, and a power take-off mechanism in said gimbal responsive to the difference in rotative speeds between said idler connection and said gimbal.

7. In combination an arcuate yoke member, a gimbal member rotatably supported at two diametrically opposed points by said yoke member for rotation about the axis defined by said points, a shaft member adapted for rotatable mounting in a bearing member, said shaft member slidingly supporting said yoke member to permit rotation of said points in the plane of said yoke member, a continuous flexible driving member disposed in a loop along said yoke, driving member, driven means engaged by said driving member comprising two wheels, said wheels being respectively disposed adjacent to said points, means comprising said wheels and said driving member for causing rotation of said points in the plane of said yoke member, said last means comprising means for rotating said gimbal about said axis, and power take-off means carried by said gimbal associated with said driving means adjacent one of said points.

FRANK V. FLYNT.

REFERENCES CITED

The following references are of record in the file of this patent:

UNITED STATES PATENTS

| Number | Name | Date |
|---|---|---|
| 1,694,477 | Long | Dec. 11, 1928 |
| 1,733,531 | Dugan | Oct. 29, 1929 |
| 1,845,592 | Fieux | Feb. 16, 1932 |
| 1,899,170 | Wainwright | Feb. 28, 1933 |
| 2,180,116 | Lapsley | Nov. 14, 1939 |

FOREIGN PATENTS

| Number | Country | Date |
|---|---|---|
| 618,593 | France | Dec. 16, 1926 |